United States Patent [19]

Miller

[11] Patent Number: 4,845,880

[45] Date of Patent: Jul. 11, 1989

[54] CASTING DEVICE FOR FISHING ROD

[76] Inventor: Michael L. Miller, 18409 E. 4th Ave., Greenacres, Wash. 99016

[21] Appl. No.: 270,366

[22] Filed: Nov. 14, 1988

[51] Int. Cl.$^4$ .................. A01K 87/00; F41B 7/02; F41F 7/00
[52] U.S. Cl. ............................................ 43/19; 124/18
[58] Field of Search .................... 43/19; 124/18, 19

[56] References Cited

U.S. PATENT DOCUMENTS

| | | | |
|---|---|---|---|
| 1,654,847 | 1/1928 | Urbuteit | 124/18 |
| 1,779,507 | 10/1930 | White | 124/18 |
| 3,172,226 | 3/1965 | Audis | 43/19 |
| 3,266,184 | 8/1966 | Brown | 43/19 |
| 3,656,252 | 4/1972 | Sherman | 43/19 |
| 3,717,947 | 2/1973 | Nomura | 43/19 |
| 4,631,852 | 12/1986 | Whritenour | 43/19 |

Primary Examiner—Nicholas P. Godici
Assistant Examiner—Carmine Cuda
Attorney, Agent, or Firm—Keith S. Bergman

[57] ABSTRACT

A casting rod provides a reel seat with trigger mechanism having a depending arm to fasten a first rearward end of an endless elastic propellant device. The second forward end of the elastic propellant device is carried by a depending arm of a stretching mechanism that is selectively positionable on the rod at plural points spacedly forward of the first depending arm. A fishing line carried in ordinary fashion by the rod is fastened to the propellant device and projected with it, responsive to trigger motion, to propel the fishing line in predetermined trajectory at a distance from the rod. The propellant device remains interconnected to the end portion of a fishing line to there serve as a float or sinker depending upon density of that propellant device.

9 Claims, 4 Drawing Sheets

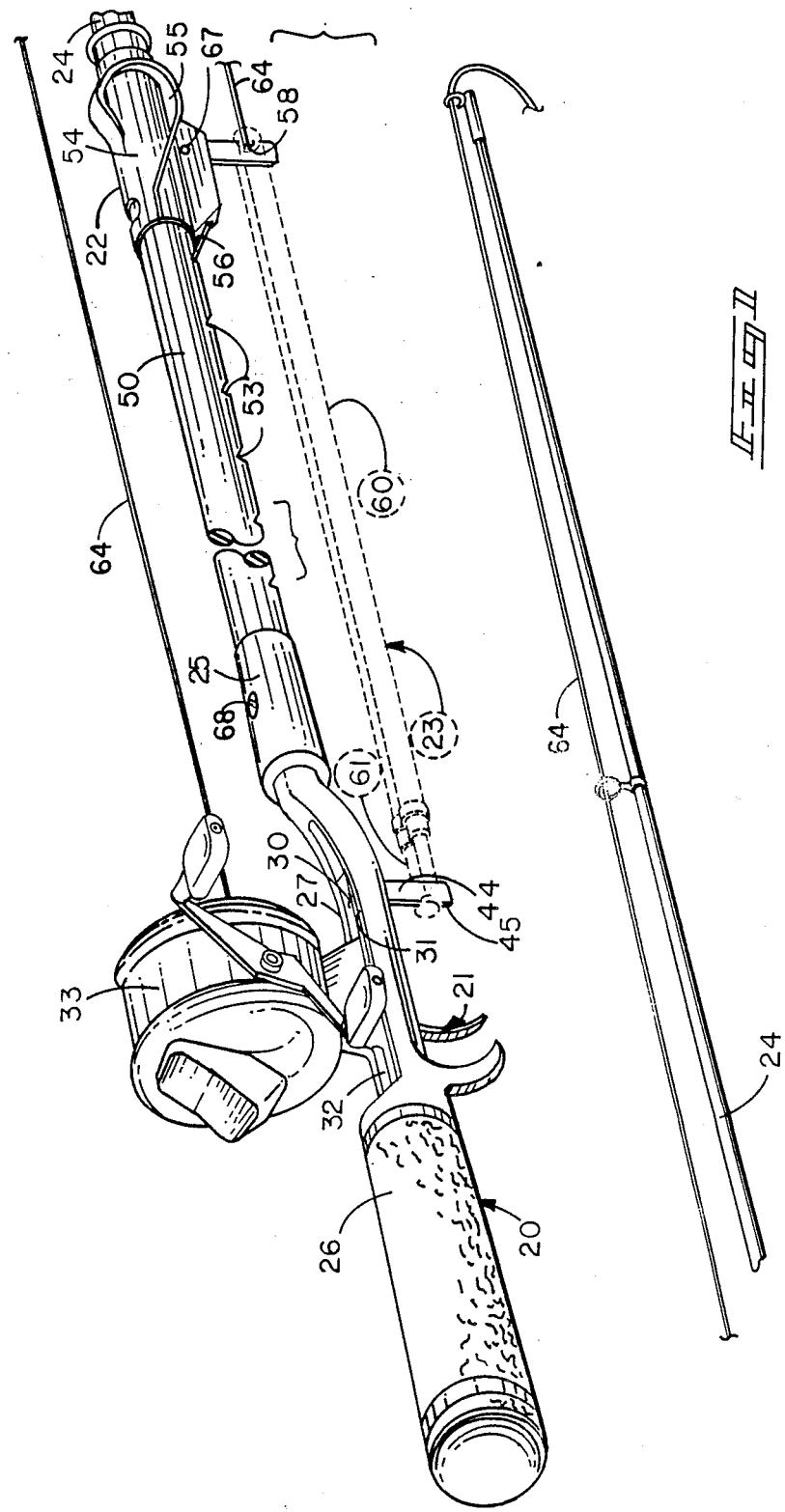

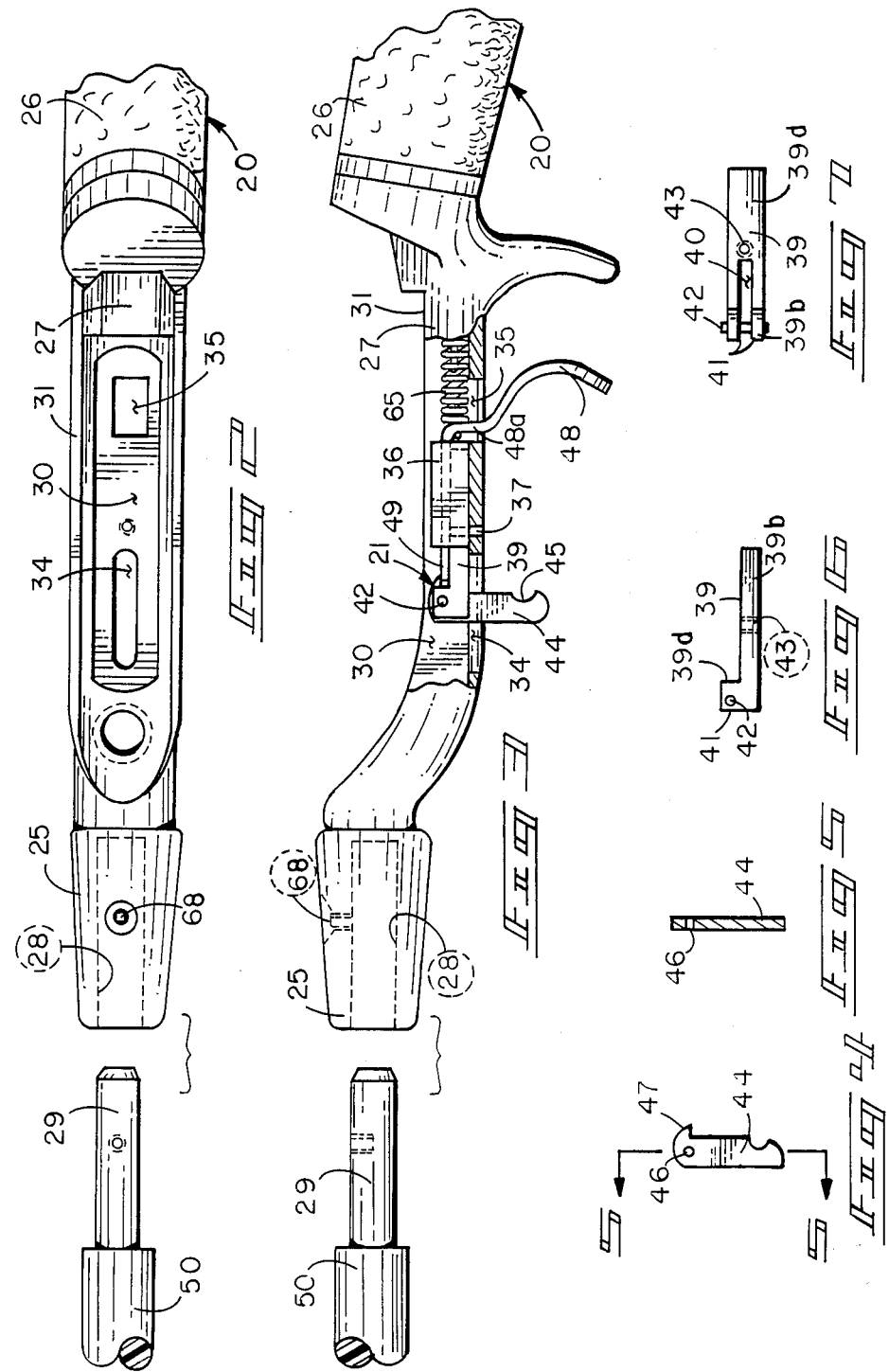

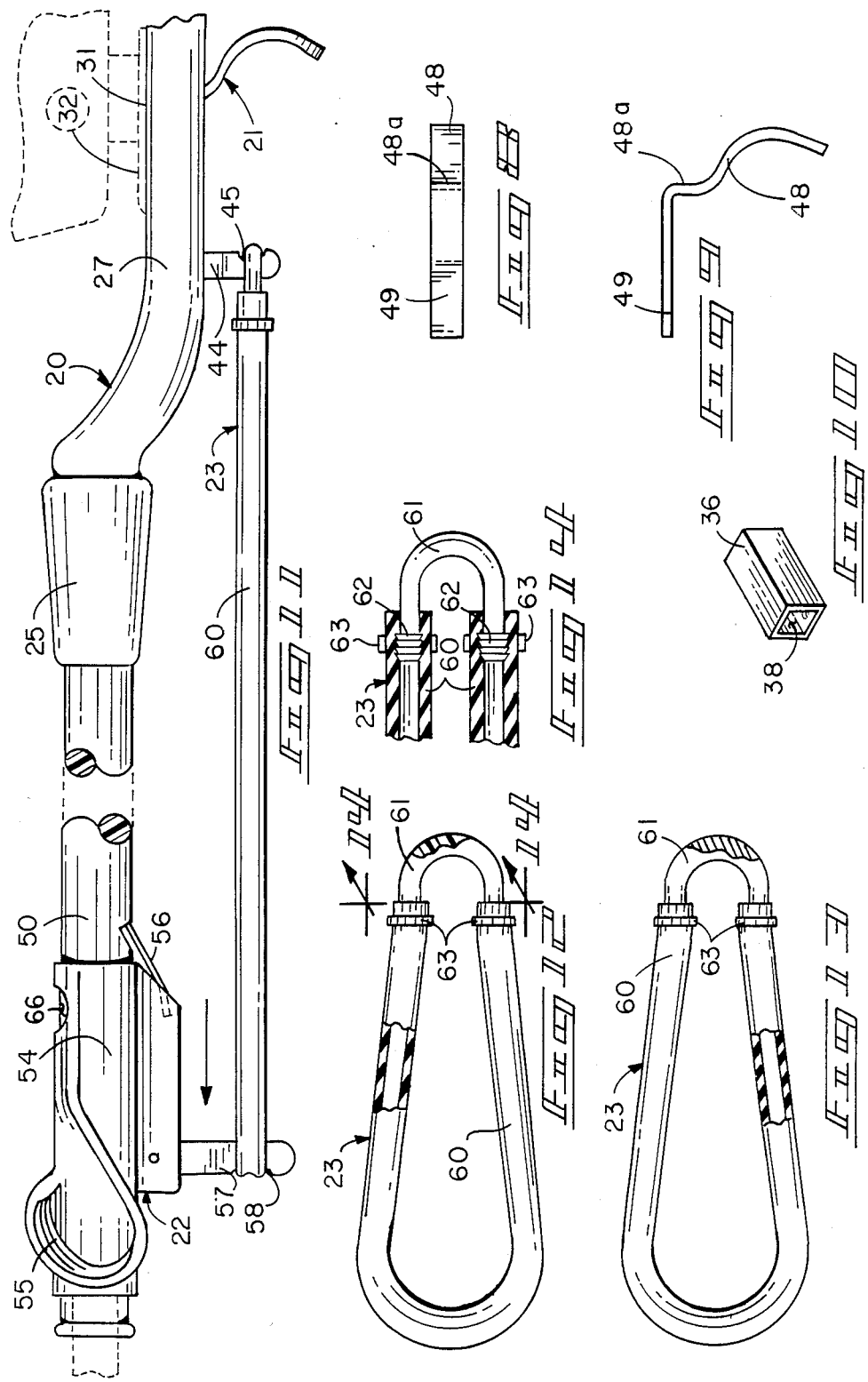

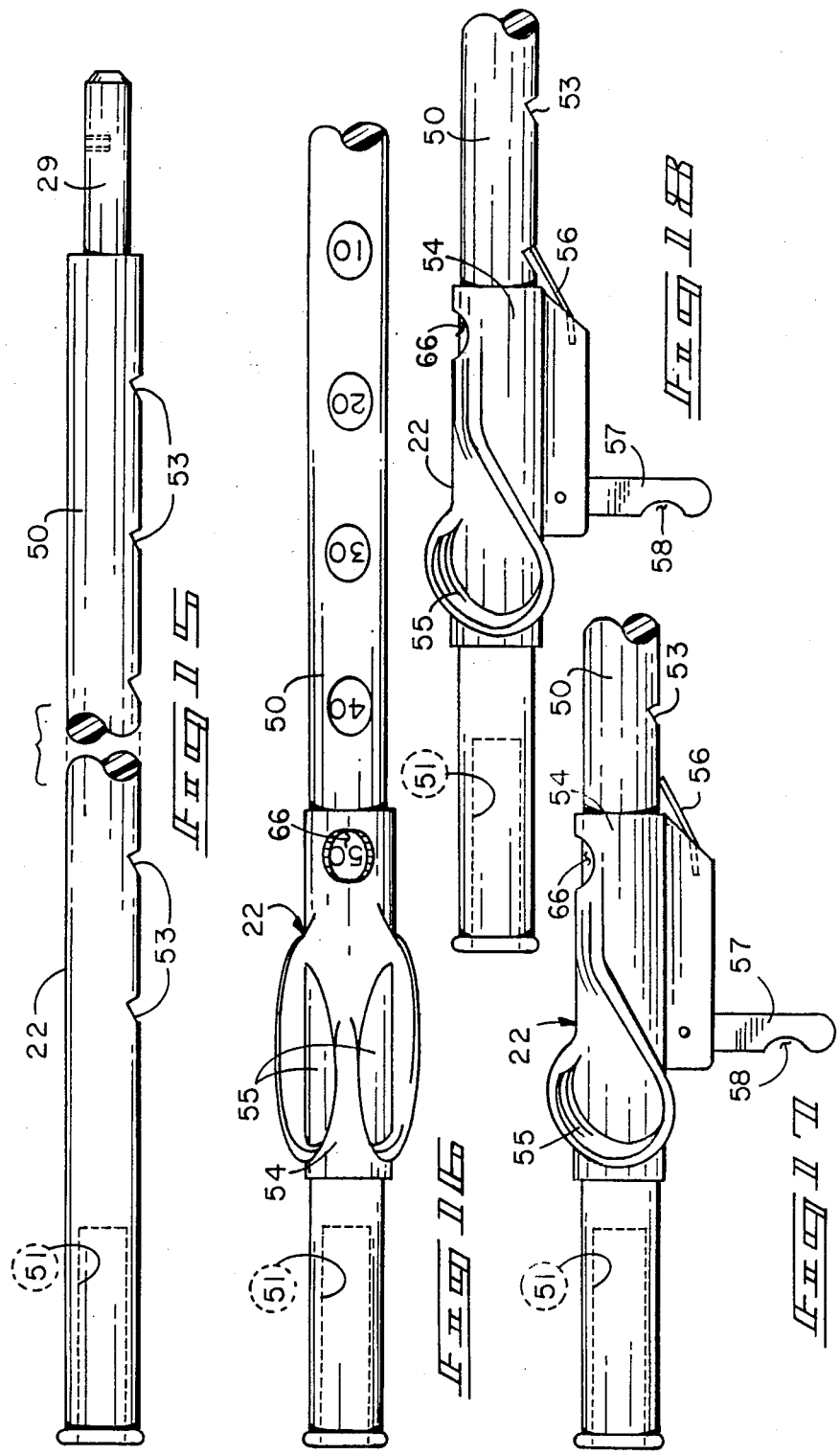

CASTING DEVICE FOR FISHING ROD

BACKGROUND OF INVENTION

1. RELATED APPLICATIONS

There are no applications related hereto heretofore filed in this or any foreign country.

2. FIELD OF INVENTION

My invention relates generally to fishing rods with means to project a line, and more particularly to such a rod that has an elastic propellant element that serves as a float or sinker on the line.

BACKGROUND AND DESCRIPTION OF PRIOR ART

It oftentimes is desirable for fishermen to have some mechanical means other than a rod itself to propel the end portion of a fishing line at a distance from the user of the rod. This may be desired at any time by novice fishermen in particular locations or under particular circumstances by experienced fishermen, and especially by physically disabled fishermen that are not able to cast fishing lines in the normal fashion by use of a fishing rod. Various mechanical casting devices to accomplish these ends have heretofore become known, but the instant invention adds a new, novel and improved member to this class of device.

The known mechanical device for casting a fishing line at a distance from a fisherman, without using the resilient deformability of the rod itself, have all provided some mechanical device for storage of kinetic energy until its desired release to propel the line. Commonly these kinetic energy storing devices of the past have been mechanical springs of one sort or another or a plunger mechanism operated by compressed gas. My invention differs from this art in providing an elongate endless elastic band structure that is stretched between two supports to create the necessary kinetic energy to fulfill its purpose by extension rather than compression. Commonly in the past, elastic members or other mechanical devices depending upon extensive force have not been used in line propelling devices because of the difficulties and in complexities of creating mechanisms that allow use of extensive forces. My invention solves this problem by allowing the propellant device to travel outwardly with the end of the fishing line being projected.

A fishing line and lures or other devices carried by it with which fishing is accomplished commonly are of small nature and low mass. Because of this when propelling forces are created in these devices, they tend to have low momentum and tend not to be propelled any substantial distance. This problem again has been recognized in the past and it has found solution most commonly by adding weights in the form of sinkers of some sort to the line being propelled. This does accomplish its purpose in enhancing momentum, but the addition of such weights may not be desirable in the ultimate fishing operation. My invention in contradistinction provides a propellant device that is fastened to the end portion of a fishing line and propelled with the line at a distance from the fisherman. This propellant device provides the necessary mass to create sufficient momentum to adequately propel a fishing line, but at the same time the propellant device has a portion which may be formed of materials of different densities to allow the device to constitute either a sinker or a float, as desired in a particular instance. This propellant device may be colored to make it more visible in the case of its service as a float or camouflage to make it less visible for use as a sinker.

My invention further provides adjustable means of regulating a trajectory of a projected fishing line to determine within limits its ultimate point of impact. The propellant device is projected essentially in the axial direction of a rod to allow the rod to serve as a guide for determining the trajectory to be established to aid in determining both azimuth and distance of impact position with reasonable accuracy. My invention further provides adjustable means of tensioning the elastic propellant device to regulate the force created upon it and thusly its velocity along its trajectory. These parameters may be readily determined and utilized by the ordinary fisherman. Prior art devices that have projected fishing lines have generally not provided means of so finely regulating these trajectory parameters and as a result, have not allowed accurate projection of a fishing line to a desired target point as is accomplished with my invention.

My mechanism in general allows the use of standard fishing poles of present day commerce so that they are habitually familiar to a user and readily available. The structure of my invention is embodied in a separable medial portion to which these existing structures may be connected. My invention also provides simple use as all of its parts are exposed for visual observation which allows a user to remedy or prevent malfunctions. This is in contradistinction to prior art devices which generally have been enclosed and not visible to a user and have required quite specialized associated structures.

My invention resides not in any one of these features per se, but rather in the synergistic combination of all of its structures that necessarily give rise to the functions flowing therefrom, as hereinafter more fully specified and claimed.

SUMMARY OF INVENTION

My invention generally provides a fishing rod defining a reel seat in its handle portion with an associated trigger mechanism having a rearward depending propellant arm that pivots responsive to trigger motion and propellant mechanism bias. A stretching mechanism slidably carried upon the rod portion immediately forwardly of its handle provides a second depending propellant arm to adjustably position the forward portion of an endless elastically resilient band of the propellant member between the two depending arms in stressed condition. The forward portion of a fishing line is carried by the rod structure in normal fashion and interconnected to the propellant device so that upon release of that device the fishing line and the propellant device are propelled at a distance from the fishing rod by reason of the kinetic energy stored in the elastic band of the propellant device.

The propellant device carries an auxiliary element in its structure that may have selectively variable density to allow the propellant device to serve either as a float or a sinker for the end portion of a fishing line which it services.

In providing such a device, it is:

A principal object of my invention to provide a fishing rod that has means of mechanically projecting the end of a fishing line responsive to action of a reusable elastomeric propellant device that remains in connection with the propelled end of the fishing line to create sufficient momentum to accomplish effective propulsion.

A further object of my invention to provide such a propellant device that has a portion selectively formed of materials of varying density to allow the propellant device to serve as either a float or sinker for the portion of a fishing line to which it is attached.

A further object of my invention to provide such a device that has trigger operated release mechanism in the rearward reel seat portion and a forward, selectively positionable, fastening member that allows predetermined adjustment of the tensive forces created in the elastic propellant device to regulate trajectory of that device.

A still further object of my invention to provide such a device wherein the elastic propellant member is projected along a line parallel to and substantially adjacent the axis of a rod to allow that rod to be used as an aiming device to aid in determining trajectory and impact point of the propellant member.

A further object of my invention to provide such a casting device that is used with traditional rods and reels of habitually familiar configuration and has its various parts visually exposed to aid and simplify operation and maintenance, but yet moves those elements to a contained position after projection of the propellant device to maintain traditional fishing rod aesthetics.

A still further object of my invention to provide such a device that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is a partial isometric view of my invention showing its various parts, their configuration and relationship.

FIG. 2 is a top orthographic view of the handle structure and its interconnection with a rod.

FIG. 3 is an orthographic side view of the same structure as illustrated in FIG. 2, but with a part of the trigger mechanism shown by cut-away and dotted outline.

FIGS. 4-10 are orthographic views of various components of the trigger mechanism.

FIG. 11 is a partial isometric view of the propellant member stretching mechanism.

FIG. 12 is an orthographic view, partially cut away for clarity, of a floating type propellant member.

FIG. 13 is an orthographic view, partially cut away for clarity, of a sinking type propellant member.

FIG. 14 is a partial cross-sectional view through the propellant member of FIG. 12, taken on the line 14—14 on that Figure in the direction indicated by the arrows.

FIG. 15 is an isometric surface view of the inner end portion of a rod defining notch structure for adjustable positioning of the propellant member stretching mechanism.

FIG. 16 shows the slidable carriage portion of the propellant member stretching mechanism and particularly its gripping structure.

FIG. 17 is a similar orthographic side view of the same mechanism shown in FIG. 16 with the stretching mechanism between positioning notches.

FIG. 18 is an orthographic side view of the structure of FIG. 16, but with the propellant member releasably maintained at one of the fastening notches.

DESCRIPTION OF THE PREFERRED EMBODIMENT

My invention generally provides fishing rod 20 having trigger mechanism 21 associated with its handle structure to carry a first end of propellant member 23 so that the second end of that propellant member may be tensioned by stretching mechanism 22 for release by the trigger mechanism to propel a fishing line attached to the propellant member.

Fishing rod 20 provides flexible rod portion 24 carried by a handle structure having forward portion 25 and rearward portion 26 located on both sides of inset reel seat 27 which carries trigger mechanism 21. Propellant stretching mechanism 22 communicates between the inner portion of rod 24 and the handle structure, commonly in a releasable fashion by means of traditional ferrule structures, providing in the instance illustrated female ferrule 28 and male ferrule 29. The reel seat illustrated is of the inset type and defines in its medial portion trigger mechanism chamber 30 depending below reel supporting surface 31 whereon feet 32 of reel 33 are releasably maintained. Forward fastening arm slot 34 and rearward trigger slot 35 communicate from the trigger chamber 30 downwardly through the reel seat structure to define orifices for depending portions of the trigger mechanism.

The trigger mechanism, as seen in FIGS. 4-10, provides fastening box 36 of elongate shape adapted to fit within the medial portion of chamber 30 and on reel seat 27, between arm slot 34 and trigger slot 35, where it is positionally maintained by fastening bolt 37 threadedly extending between that element and the reel seat. The fastening box defines medial channel 38 which carries "L" shaped fastening arm yoke 39 having elongate body portion 39a carried in channel 38 and extending forwardly thereof to define slot 40 which separates fastening ears 41 that carry rearward fastening arm axle 42 in forward fastening ears 39b. The medial portion of fastening arm 39 defines hole 43 to accept fastener 37 for positional maintenance.

Rearward fastening arm 44 is an elongate flat element defining holding groove 45 in its lower rearward portion, axle hole 46 for pivotal mounting on an axle 42 in its upper medial portion, and rearwardly extending fastening dog 47 in its upper rearward portion, all as illustrated in FIG. 4 and 5. The structure is mounted for pivotal motion on axle 42 with its body depending through channel 40 in the fastening arm yoke and through slot 34 in the forward portion of the reel seat. The lower surface of fastening dog 47 is so configured to fit immediately upwardly adjacent arm 49 of the trigger mechanism when that arm be in an overlying relationship to the upper surface of fastening arm yoke 39, as illustrated in FIG. 3. The upper surface of fastening dog is curved convexly, as illustrated, to maintain its lower portion in a forward position during non-use and until cocked by pulling the lower portion rearwardly to its supportive position.

As shown particularly in FIG. 8 and 9, traditionally shaped trigger 48 structurally communicates with forwardly extending trigger arm 49 configured to fit immediately upwardly adjacent fastening arm portion 39a and within channel 38 of the fastening box, as illustrated in FIG. 3. The forwardmost extension of the trigger arm 49 is such as to extend beneath fastening dog 47 of depending rearward fastening arm 44 when in its forwardmost position. Compression spring 65 extends from the rearward surface of upper portion 48a of the trigger rearwardly to support on the rearward surface defining trigger mechanism chamber 30 to bias the trigger structure 48, 49 to a forward position adjacent fastening arm 44 when this arm is in a vertical position, but allow rearward motion against this bias to release the fastening arm to allow its lower portion to pivot forwardly.

Propellant stretching mechanism 22 is illustrated particularly in FIGS. 15-18. This mechanism provides base section 50 of a fishing rod that is rigid and inflexible so as not to deform to bind the motion of the stretching mechanism therealong. This base rod section is releasably positionable between the rod and handle structure by means of forward female ferrule 51 that releasably joins rod 24 in a slidable fit and rearward male ferrule 29 that releasably joins the handle structure in similar fashion. Base section 50 defines plural spaced fastening notches 53 in axial alignment along its cylindrical surface.

Stretching sleeve 54 is carried for slidable motion upon the base section 50. This sleeve defines similar paired opposed finger grips 55 on its external surface to aid manual manipulation of the sleeve by allowing simple and easy grasping. These grips are so designed as to be usable by various combinations of fingers of either hand in various positions to accommodate fishermen of either manual dexterity. The side of sleeve 54, opposite the portion between finger grips 55, carries outwardly projecting support fastening element 56 extending from the rear portion of the fastening sleeve to a spaced distance from its forward end. The forward portion of fastener 56 carries depending propellant fastener 57 for pivotal motion of its lower portion about pin 67 in forward direction but not past vertical in a rearward direction. Fastener groove 58 is defined in the forward facing edge of fastener 57 to aid support of a propellant member. The rearward portion of fastening element 56 carries a radially inwardly and rearwardly angling resilient stop which is configured and positioned to contact fastening notches 53 defined in the rod base section to prevent motion rearwardly of the notch being contacted, but yet allow forward motion of the stretching sleeve. Preferably, fastening element 56 is formed of a material such as spring steel which has appropriate elastic resiliency to allow the configurational changes required of it.

Since in the use of my invention there is some forwardly directed force at times created upon rod base section 50, it is desirable to provide means for releasably fastening the ferrule structure joining the rod base member to the handle. This may be simply and easily accomplished by means of bolt 68 that extends through an appropriately configured hole in the forward portion of forward handle element 25 to frictionally extend into the channel defined by the female portion 28 of the ferrule structure.

Propellant member 23 is illustrated particularly in FIGS. 12-14 where it is seen to provide elongate tubular elastomeric element 60 having its ends joined to form a continuous band by rigid "U" shaped connecting element 61. The connecting element has end structure 62 configured to aid its positional maintenance after placement within the ends of the channel defined in tube 60 after placement, in the instance illustrated a series of spaced annular ridges. This positional maintenance is enhanced by fastening bands 63 carried on the external surface of the tubular element, outwardly adjacent fastening structure 62 of the fastening elements. Connecting element 61 may be formed of various materials, such as low density plastic illustrated in FIG. 12 or higher density metal illustrated in FIG. 13. The density of this element may be regulated, in conjunction with the density of the remaining portion of the elastic tube 60, so that the entire propellant member will have a density either above or below the density of water to allow it to sink or float as desired. The length of elastic tube 60 is such that when carried by the depending fastening arms 44 and 57 it will be under some elastic tension when moved at least to the forward portion of rod base section 50. Though the element 60 is shown as an elastic tube, it may be formed of other elongate elastic elements, but the material of preference remains ordinary rubber surgical tubing as this material seems to provide both maximum elasticity and durability.

Having described the structure of my invention, its use may be understood.

Firstly, a fishing rod is formed according to the foregoing specification and assembled as indicated. The rod portion, handle structure and reel may generally constitute any of the general types heretofore known and commonly used in the present day fishing arts. The configuration of these structures is not limited to the offset-type reel seat and closed-faced spinning reel illustrated. Once assembled, the rod structure has line 64 from its reel 33 threaded through the rod guides in normal fashion.

A propellant member is then selected, the choice depending upon whether it be desired that the propellant member serve as a sinker or a float after projecting a line to its target area. The selected propellant member is then fastened to the end portion of a fishing line according to the particular type of fishing activity desired. Normally the propellant member will be fastened to the line, by tying or otherwise, at a spaced distance inwardly from the end portion, as bait, lures and some hooking structure are commonly carried at the end of a line and it generally is not desired that these structures be interfered with by the propellant device. Further if the propellant member is to be used either as a sinker or a float, it commonly is desired that it be associated with a line at a spaced distance from a lure or bait according to fishing principles heretofore known. The method of attachment of a line to the propellant device is not critical and may be accomplished by methods heretofore known in the fishing arts. The only requirement of this interconnection is that the line be appropriately attached to the propellant device so that it will remain in attachment during ordinary fishing operations. Commonly, the line will be attached about "U" shaped fastening element 61, but it may also be fastened about the elastic tubular element 60 or fastened so that the elastic tubular element constitutes a part of a line to serve as a shock absorber.

After affixing a line to the propellant member, that member is established between rearward fastening arm 44 and forward fastening arm 57 substantially as illustrated in FIG. 1. The orientation of the propellant member in this configuration preferably places the "U" shaped member 61 about rearward depending fastening arm 44, though this is not essential and member 61 could be placed about forward arm 57 or in fact, at some position in between, though not so effectively. Stretching sleeve 54 is then grasped by an operator, preferably by finger grips 55, and moved forwardly by manual manipulation until the sleeve creates appropriate tension in the elastic tubular element 60 of the propellant member. When in proper position, fastening element 56 is engaged in the nearest fastening notch 53 so as to positionally maintain the stretching sleeve on rod base section 50.

In the interim, the trigger mechanism will be moved by the bias created in it by spring 65 so that forward arm 49 will rest beneath fastening dog 47 to maintain the rearward fastening arm 44 in its vertically depending position. In this condition, my casting rod is ready for use.

To use the casting rod, it is merely necessary to determine the target area, aim the rod relative thereto, and release the propellant member by pulling trigger 48 rearwardly. When the trigger is pulled rearwardly, its forward arm 49 will move rearwardly from under fastening dog 47 of the rearward fastening arm 44. When this occurs, since the lower portion of arm 44 is free to pivot in a forwardly direction, it will do so by reason of the force of the stretched elastic element 60 of the propellant member and as this occurs, the rearward portion of the propellant member will be released from arm 44 to move forwardly by reason of its tension. As this occurs fastening element 61 will move forwardly to contact the lower portion of forward fastening arm 57 and the force imposed on that arm will pivot its lower portion forwardly to allow the propellant member to pass forwardly therepast. This action of the propellant member creates some momentum in it, depending upon the force in the elastic element 60, and propels the propellant member some distance forwardly of the rod to carry the attached line with it to a target area where it is desired to locate the end portion of a fishing line.

In accomplishing this casting function, it is to be particularly noted that the azimuthal direction of the target area may be regulated by aligning the elongate rod therewith. It is further to be noted that the distance of projection of the propellant member may be regulated to some degree by regulating the vertical angle of the rod relative to the horizontal and also by regulating the amount of tension in the elastic element 60. These parameters may be fairly accurately determined emperically to allow the propellant member to be cast to a reasonably small target area with substantial accuracy and with very little experience. If desired, various fastening element positions may be identified or provided with distance scales, viewed through window 66, to indicate the distance of projection of a propellant member at a particular vertical angle.

It is to be further noted that in using my casting device, very little skill or knowledge is required and its use may be accomplished by almost anyone. Its use is quite mechanically simple in the manual manipulations required so that the device may be readily used by persons suffering from various physical and mental disabilities as well as by ordinary fishermen who either desire to use it or are required to do so by particular fishing circumstance.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters and Patent, and what I claim is:

1. A casting device for an elongate fishing rod having a handle defining a medial reel seat and a rigid base section, comprising, in combination:
   a trigger mechanism carried by said reel seat having a pivotally mounted depending rearward fastening arm pivotally movable in a forward direction responsive to motion of an associated trigger;
   propellant stretching mechanism having an elongate stretching sleeve slidably movable along said base section of said rod adjacent the handle, said base section of the rod defining plural axially spaced notches and said stretching sleeve having means to aid its manual manipulation and a rearwardly extending resilient catch to releasably engage one of said notches to prevent the stretching sleeve from moving rearwardly past the engaged notch, said stretching sleeve carrying in its forward portion a depending forward fastening arm with its lower portion pivotal only forwardly of vertical; and
   a propellant member comprising an endless band, at least the major portion of which is elastically resilient, positionable under tension between said forward and rearward fastening arms.

2. The invention of claim 1 wherein the elastically resilient band includes a "U" shaped rigid element of sufficiently low density to cause the propellant member to float in water.

3. The invention of claim 1 wherein the propellant member includes a rigid "U" shaped portion of dense material that causes the propellant member to sink in water.

4. The invention of claim 1 further characterized by said reel seat defining a trigger chamber having a rearward trigger slot and a spacedly forward fastening arm slot defined through the reel seat to communicate with the chamber, and said trigger mechanism further comprising:
   a fastening box defining a medial channel carried by said reel seat in the trigger chamber between the trigger slot and forward fastening arm slot;
   an elongate fastening arm yoke carried within the channel defined by the fastening box and extending forwardly thereof to pivotally mount the rearward fastening arm depending therefrom and through the fastening arm slot, said rearward fastening arm having a rearwardly extending fastening dog in its upper portion;
   a trigger, depending through the rearward trigger slot and having a forward portion movably carried in the channel of the fastening box to extend forwardly of the fastening box to releasably engage the fastening dog of the forward fastening arm when in a forward position, but disengage from that dog when in a rearward position; and means of biasing the trigger to a forward position.

5. The invention of claim 1 wherein said base section defining fastening notches is a rigid element releasably carried between a flexible rod forwardly thereof and a handle structure rearwardly thereof.

6. A casting device, for a fishing rod having a forward flexible portion, a rearward substantially rigid base section and a handle defining a reel seat, comprising, in combination:
- a trigger mechanism, carried in the reel seat portion of said handle, having a depending rearward fastening arm pivotally movable in a forward direction responsive to rearward motion of a normally forwardly biased trigger;
- said rigid base section defining plural axially spaced notches and having releasable means of fastening the base section between the handle and a forwardly extending flexible rod;
- a propellant stretching mechanism including a sleeve slidably carried on the rod base section with a depending forward fastening arm pivotal forwardly of vertical and a rearward resilient fastening element selectively releasably engageable with the notches in the rod base section to prevent sleeve motion rearwardly of the engaged notch; and
- a propellant member have an elastically resilient tube interconnected in its end parts by a "U" shaped element to form a continuous band for carriage between said forward fastening arm and said rearward fastening arm.

7. The invention of claim 6 wherein the propellant member is formed of material that cause it to sink in water.

8. The invention of claim 6 wherein the propellant member is formed of material that cause it to float in water.

9. The invention of claim 6 wherein a fishing line carried by a reel mounted on said fishing rod is attached to the propellant member to be propelled at a distance from the rod.

* * * * *